US009658775B2

(12) United States Patent
Guo

(10) Patent No.: US 9,658,775 B2
(45) Date of Patent: May 23, 2017

(54) ADJUSTING PAGE SHARING SCAN RATES BASED ON ESTIMATION OF PAGE SHARING OPPORTUNITIES WITHIN LARGE PAGES

(71) Applicant: VMware, Inc., Palo Alto, CA (US)

(72) Inventor: Fei Guo, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 201 days.

(21) Appl. No.: 14/536,452

(22) Filed: Nov. 7, 2014

(65) Prior Publication Data

US 2016/0098207 A1 Apr. 7, 2016

Related U.S. Application Data

(60) Provisional application No. 62/060,499, filed on Oct. 6, 2014.

(51) Int. Cl.
*G06F 12/08* (2016.01)
*G06F 3/06* (2006.01)

(52) U.S. Cl.
CPC .......... *G06F 3/0608* (2013.01); *G06F 3/0641* (2013.01); *G06F 3/0644* (2013.01); *G06F 3/0659* (2013.01); *G06F 3/0664* (2013.01); *G06F 3/0673* (2013.01)

(58) Field of Classification Search
CPC .. G06F 12/0246; G06F 12/0253; G06F 3/065; G06F 12/1009; G06F 9/45558; G06F 12/109; G06F 12/1036; G06F 2212/657; G06F 3/0641
See application file for complete search history.

(56) References Cited

U.S. PATENT DOCUMENTS

| 6,789,156 | B1* | 9/2004 | Waldspurger | G06F 12/1018 711/202 |
| 7,130,983 | B1* | 10/2006 | DeTar, Jr. | G06F 3/0617 711/210 |
| 2009/0034020 | A1* | 2/2009 | Bokelman | H04N 1/0473 358/474 |
| 2010/0106930 | A1* | 4/2010 | Foltz | G06F 12/1009 711/165 |
| 2012/0221784 | A1* | 8/2012 | Ban | G06F 12/0246 711/103 |
| 2014/0176451 | A1* | 6/2014 | Chang | G06F 1/3262 345/173 |
| 2014/0331017 | A1* | 11/2014 | Dawson | G06F 9/45558 711/162 |

* cited by examiner

*Primary Examiner* — David X Yi
*Assistant Examiner* — Candice Rankin
(74) *Attorney, Agent, or Firm* — Patterson & Sheridan LLP

(57) ABSTRACT

Memory performance in a computer system that implements large page mappings is improved by dynamically tuning the page scan rate at which a memory sharing module (e.g., in a hypervisor) performs small page scanning operations that identify and exploit potential small page sharing opportunities within large pages. In operation, when free memory is relatively low, the hypervisor adjusts the page scan rate based on a statistical estimate of the percentage of virtual small pages that are mapped to physical large pages that are shareable. In this fashion the hypervisor dynamically tunes the sharing rate to reflect memory usage of applications. Further, unlike conventional approach to page sharing, the hypervisor proactively breaks large pages before resorting to more expensive memory reclamation techniques, such as ballooning and host swapping.

22 Claims, 6 Drawing Sheets

ADJUSTING PAGE SHARING SCAN RATES BASED ON ESTIMATION OF PAGE SHARING OPPORTUNITIES WITHIN LARGE PAGES

CROSS-REFERENCE TO RELATED APPLICATION(S)

This application claims the benefit of U.S. Provisional Application No. 62/060,499, filed Oct. 6, 2014.

BACKGROUND

Operating systems and hypervisors that support execution of multiple contexts such as virtual machines (VMs) running in computer systems typically employ a page table translation hierarchy to manage mapping of memory from a virtual memory space (the memory visible to a VM) to a physical memory space (the hardware memory available on a host computer) that is divided into pages. Each page is a block of contiguous memory addresses, but page sizes may vary. When a page is mapped from an entry of a page table at the lowest level (level 1), the size of the page is the smallest size that is supported by the computer system. When a page is mapped from an entry of a page table at a higher level (level N>1), the size of the page is a larger size that is supported by the computer system. As referred to herein, "small" pages are of a smaller size than "large" pages, but small pages are not necessarily the smallest size that is supported by the computer system. Similarly, large pages are not necessarily the largest size that is supported by the computer system.

To increase memory performance, computer systems often employ a translation lookaside buffer (TLB) to cache mappings from virtual memory space to physical memory space. Since the size of the TLB is limited, computer systems may further optimize performance by using large pages in the physical memory space to back up pages in the virtual memory space to decrease the likelihood of TLB misses (i.e., mappings that are not stored in the TLB). However, if the available physical memory becomes scarce, reclaiming memory through sharing pages is made difficult. In particular, sharing large pages is typically not implemented, since the occurrence of identical large pages is usually very small and the overhead associated with identifying large pages is relatively high. Further, sharing small pages is complicated by the large page mappings, even though small pages within large pages are sharable. This unnecessarily wastes memory and leads to performance degradation.

In an attempt to reduce performance degradation, if memory becomes strained, then some hypervisors identify likely candidates for sharing at the small page granularity, break the large pages that back these small pages, and share duplicated small pages. This technique is described in U.S. patent application Ser. No. 13/935,382, entitled "Identification of Page Sharing Opportunities Within Large Pages," the entire contents of which are incorporated by reference herein. To facilitate this sharing process, a memory sharing module (which may be located in a hypervisor) scans the virtual memory space of the VM for duplicated small virtual pages at a predetermined, fixed, page scan rate. If the memory is strained, and the small virtual page is duplicated, then the hypervisor selects the small virtual page for sharing, including breaking any large physical page that backs the small virtual page. In operation, breaking such large pages allows the hypervisor to reclaim unused or shared portions of large pages and, thus, reduce memory pressure.

However, in this strained memory state, the hypervisor also performs other reclamation operations, such as ballooning and host swapping, that consume more computer resources than identifying and breaking large pages that include duplicated small pages. If the page scan rate is relatively low compared to the percentage of large pages that back duplicated small pages, then the amount of time it takes for the small page scanning operations to reduce memory pressure may be unnecessarily long, and cause the hypervisor to employ the more expensive memory reclamation techniques. Conversely, the page scan rate may be too high if page sharing opportunities that are identified are not being exploited because memory is no longer strained.

SUMMARY

One or more embodiments provide techniques to tailor the rate at which small pages are scanned for duplicates (page scan rate) to optimize opportunities to relieve memory pressure through page sharing when memory becomes strained.

A method of determining a page scan rate of a memory that is partitioned and accessed as large physical pages and small physical pages to identify potential page sharing opportunities includes: scanning at least one context for duplicated small virtual pages at a configurable page scan rate, where each context has a virtual memory divided into a plurality of small virtual pages that are mappable to the physical pages; statistically estimating a percentage of small virtual pages mapped to large physical pages while performing small virtual page scanning operations at a first page scan rate; and determining that the amount of free physical memory has decreased below a high memory threshold and, in response, determining a second page scan rate based on the percentage of small virtual pages mapped to large physical pages that are shareable and performing small virtual page scanning operations at the second page scan rate instead of the first page scan rate.

Further embodiments of the present invention include a non-transitory computer-readable storage medium comprising instructions that cause a computer system to carry out the above method as well as a computer system configured to carry out the above method.

Advantageously, overall computer system performance is optimized by adjusting the page scan rate to reflect the effectiveness and likelihood of successfully sharing small pages that are backed by large pages. More specifically, when opportunities to share small pages that are backed by large pages are high and memory becomes strained, the rate at which large pages are broken and small pages are shared increases. Conversely, when such opportunities are low or the memory is not strained, the page scan rate decreases. Overall computer system performance is further optimized by proactively breaking large pages that back duplicated small pages when memory is strained and before performing more resource consuming memory reclamation techniques, such as ballooning and host swapping.

DETAILED DESCRIPTION

Figure 1:
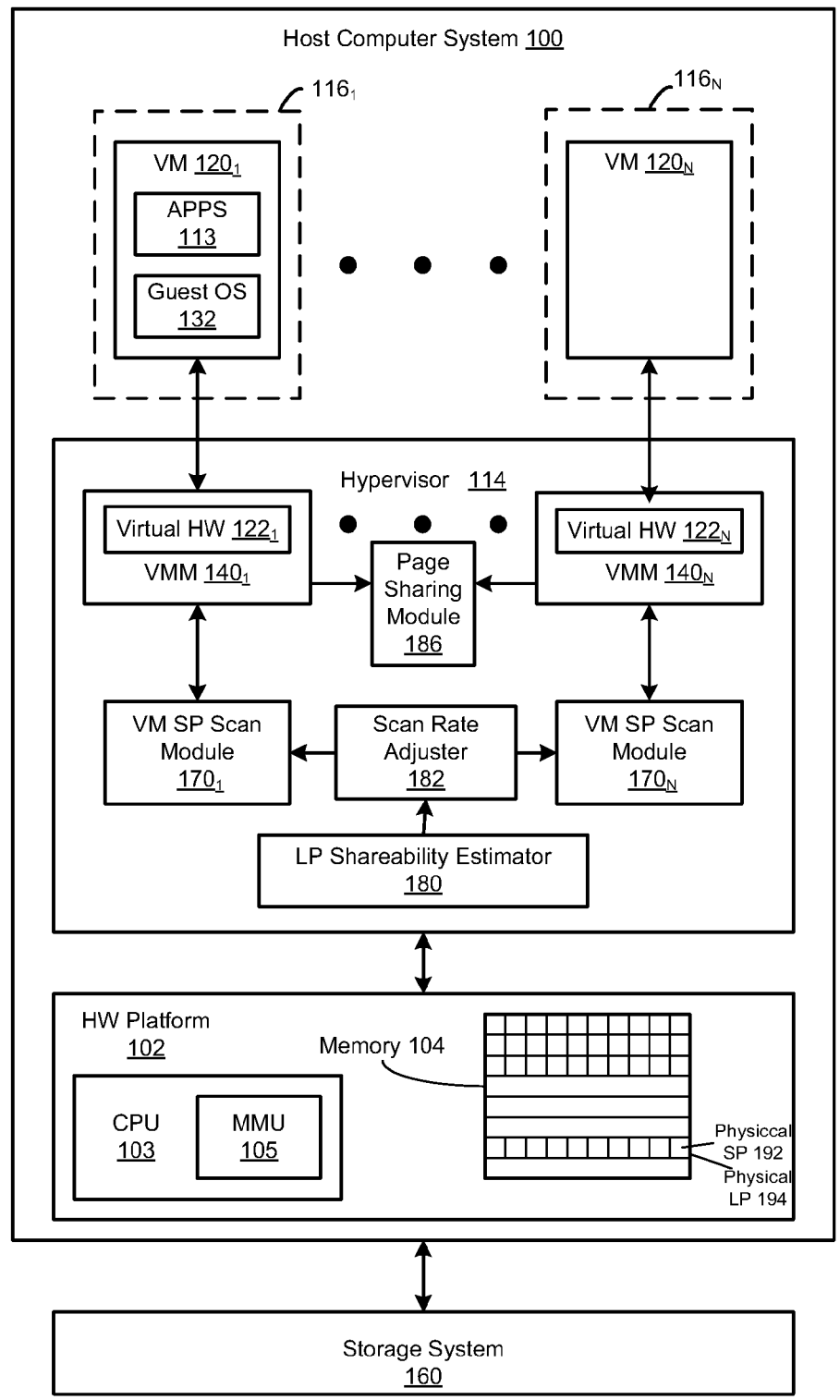
FIG. 1 is a block diagram of a virtualized computer system that is configured to perform small page scanning operations at a dynamically configurable page scan rate, according to one or more embodiments.

FIG. 1 is a block diagram of a virtualized computer system that is configured to perform small page scanning operations at a dynamically configurable page scan rate, according to one or more embodiments. Host computer system 100 may be constructed on a desktop, laptop or server grade hardware platform 102, such as an x86 architecture platform. Hardware platform 102 includes one or more central processing units (CPU) 103, host physical memory 104 (referred to herein both as "physical memory" and "memory"), and other standard hardware components such as network interface controllers (not shown) that connect host computer system 100 to a network and one or more host bus adapters (not shown) that connect host computer system 100 to a persistent storage device, illustrated herein as storage system 160.

A hypervisor 114 is installed on top of hardware platform 102. Hypervisor 114 supports multiple virtual machine (VM) execution spaces $116_1$-$116_N$, within each of which a VM process is executed to instantiate corresponding VMs $120_1$-$120_N$. For each of VMs $120_1$-$120_N$, a resource scheduling module included in hypervisor 114, manages a corresponding virtual hardware platform (i.e., virtual hardware platforms $122_1$-$122_N$) that includes emulated hardware such as virtual CPUs (vCPUs) and guest physical memory. Each virtual hardware platform 122 supports the installation of a guest operating system (OS) (e.g., guest OS 132). In each instance, the guest OS provides user-level applications running in the virtual machine, e.g., APPS 113, an interface to the virtual hardware platform of the virtual machine.

It should be recognized that the various terms, layers and categorizations used to describe the virtualization components in FIG. 1 may be referred to differently without departing from their functionality or the spirit or scope of the invention. For example, virtual hardware platforms $122_1$-$122_N$ may be considered to be part of virtual machine monitors (VMM) $140_1$-$140_N$ which implement the virtual system support needed to coordinate operations between hypervisor 114 and their respective VMs. Alternatively, virtual hardware platforms $122_1$-$122_N$ may also be considered to be separate (e.g., as a component of its corresponding virtual machine since such platforms include the hardware emulation components for the virtual machine) from VMMs $140_1$-$140_N$, and VMMs $140_1$-$140_N$ may be considered to be separate from hypervisor 114. One example of hypervisor 114 that may be used is included as a component of VMware VMware® vSphere product, which is commercially available from VMware, Inc.® of Palo Alto, Calif. It should further be recognized that other virtualized computer systems are contemplated, such as hosted virtual machine systems, where the hypervisor is implemented in conjunction with a host operating system.

CPU 103 has a memory management unit (MMU) 105 that carries out the mappings from a virtual address space of VMs $120_1$-$120_N$ or any other applications running on hypervisor 114 to a physical address space of memory 104 (referred to herein as the "host physical address space") using either a translation lookaside buffer (not shown) or page tables (not shown in FIG. 1) stored in memory 104. In embodiments using shadow page tables to map guest virtual address spaces (which is a continuous virtual memory space presented by the guest operating system 132 in virtual machine 120 to applications 113) within VMs $120_1$-$120_N$ directly to the physical address space of memory 104, the virtual address space of VMs $120_1$-$120_N$ referred to herein corresponds to one of the guest virtual address spaces within VMs $120_1$-$120_N$, and the page tables referenced herein correspond to the shadow page tables. In embodiments using extended or nested page tables where guest virtual address spaces within VMs $120_1$-$120_N$ are mapped to a guest physical address space (which is the memory visible to guest operating system 132 running in virtual machine 120) using guest pages tables and the guest physical address space is mapped to the host physical address space (which is the memory visible to hypervisor 114 and which is the physical memory available on host computer system 100) using extended or nested page tables, the virtual address space of VMs $120_1$-$120_N$ referred to herein corresponds to the guest physical address space and the page tables referenced herein correspond to the extended or nested page tables. The mappings may be to a physical small page (SP) 192 in memory 104 or a physical large page (LP) 194 in memory 104. In the x86 architectures, the typical size for small pages is 4 KB and the typical size for large pages is 2 MB. However, it should be recognized that embodiments may be practiced with different small page sizes and different large page sizes.

Memory pressure is reduced when a page sharing module 186 "breaks" selected physical LPs 194 (i.e., change the mappings from a selected physical LP 194 to mappings to physical SPs 192), and subsequently reclaims portions of memory 104 backing virtual SPs that were previously backed by selected physical LPs 194. In operation, VMMs 140 are programmed to receive potentially duplicated virtual SPs for sharing at the granularity of small pages and then forward these potentially duplicated virtual SPs to page sharing module 186. Page sharing module 186 receives and evaluates potentially duplicated virtual SPs and frees up memory allocated to such small pages through successful page sharing. In particular, if page sharing module 186 receives a duplicated virtual SP that is backed by physical LP 194, then page sharing module 186 breaks physical LP 194 into physical SPs 192 prior to sharing the duplicated physical SPs 192 and reclaiming portions of memory 104. The techniques to free up memory through page sharing are described in detail in U.S. Pat. No. 6,789,156, the entire contents of which are incorporated by reference herein. According to embodiments, each VM 120 has a corresponding VM small page (SP) scan module 170 that scans virtual SPs at a dynamically configurable page scan rate, performs comparisons between virtual SPs, and identifies duplicated virtual SPs that are likely candidates for sharing. VM SP scan module 170 then selectively sends duplicated virtual SPs to VMM 140 for sharing by page sharing module 186, thus reducing memory pressure.

The operations that VM SP scan modules 170 perform to identify duplicated virtual SPs and selectively send duplicated virtual SPs to VMM 140 and then page sharing module 186 for sharing are referred to herein as "small page scanning operations." These small page scanning operations consume host computer system 104 resources and, depending on the usage of memory 104, the performance reduction incurred by performing small page scanning operations may exceed the performance gain attributable to the resulting reduced memory pressure. Reducing the page scan rate at which VM SP scan modules 170 perform small page scanning operations limits the performance impact of performing small page scanning operations. However, reducing the page scan rate also increases the likelihood that the amount of memory 104 that is unallocated (i.e., free memory) becomes scarce and hypervisor 114 employs more resource intensive memory reclamation techniques to more aggressively reclaim portions of memory 104.

For this reason, embodiments provide a large page (LP) shareability estimator 180 and a scan rate adjuster 182 that, together, dynamically tune the page scan rate of VM SP scan modules 170 to reflect the memory usage of applications 113 executing in VMs 120. In operation, when the amount of free memory 104 is relatively high, the page scan rate is set to a relatively low default and LP shareability estimator 180 generates a statistical estimate of the percentage of virtual SPs backed by physical LPs 194 that are duplicated. Subsequently, when free memory 104 is relatively low, scan rate adjuster 182 tunes the page scan rate based on the estimated percentage of virtual SPs backed by physical LPs 194 that are duplicated. Notably, VMMs 140 and page sharing module 186 break physical LP 194 in response to receiving a duplicated virtual SP mapped to physical LP 194 from VM SP scan modules 170. Consequently, tuning the page scan rate in this fashion optimizes the rate at which page sharing module 186 breaks physical LPs 194 to reflect the likelihood of successfully sharing virtual SPs backed by physical LPs 194 and reclaiming the corresponding portions of memory 104.

Figure 2A:
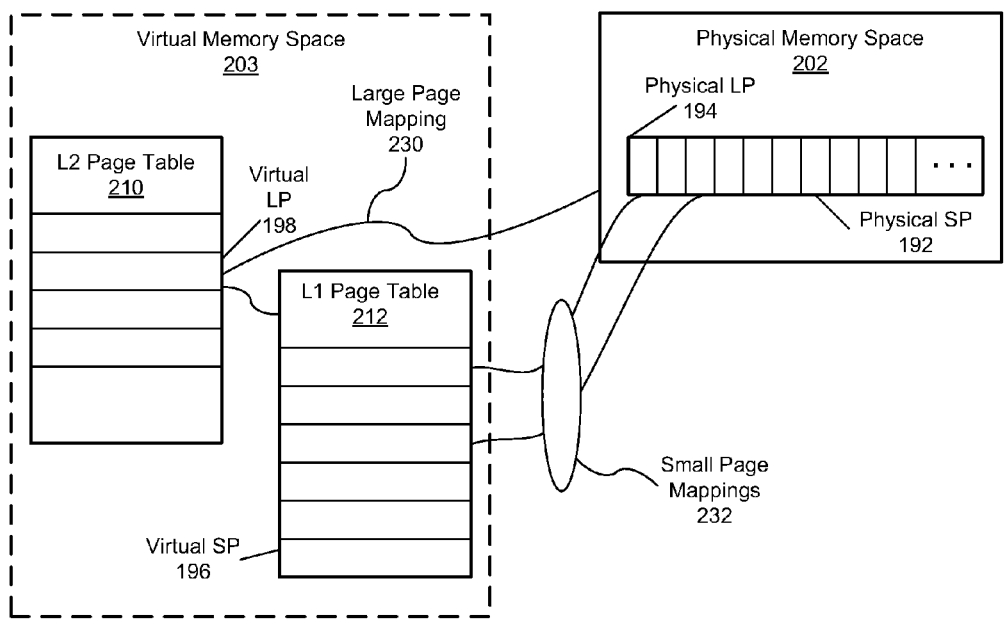
FIGS. 2A and 2B are conceptual diagrams that illustrate a page table translation hierarchy that translates guest physical addresses in a virtual memory space to host physical addresses in a physical memory space according to one or more embodiments.
Figure 2B:
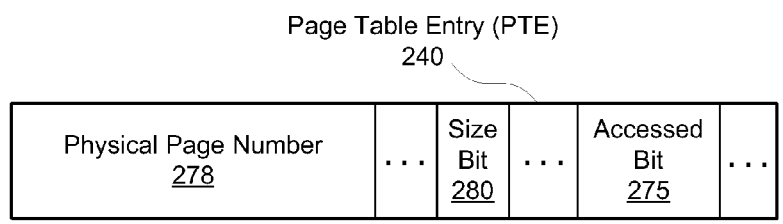

FIGS. 2A and 2B are conceptual diagrams that illustrate a page table translation hierarchy that translates guest physical addresses in a virtual memory space 203 to host physical addresses in a physical memory space 202 according to one or more embodiments. Notably, physical memory space 202 is partitioned into physical large pages 194 and physical small pages 192. Virtual memory space 203 is partitioned in virtual large pages 198 and virtual small pages 196 that are mappable to physical pages in physical memory space 202. The exemplary page table translation hierarchy depicted in FIGS. 2A and 2B includes a level 1 (L1) page table 212 and a level 2 (L2) page table 210. L1 page table 212 is at the lowest level of the page table translation hierarchy, and L2 page table 210 is at the next level up from L1 page table 212 in the page table translation hierarchy. Both L1 page table 212 and L2 page table 210 include page table entries (PTEs) 240. Each PTE 240 includes, inter alia, a physical page number (PPN) 278, a size bit 280, and an accessed bit 275. It should be understood that FIGS. 2A and 2B illustrate one possible configuration of a page table translation hierarchy and bits in PTE 240, and the number and arrangement of elements in the page table translation hierarchy and PTE 240 can be varied from what is shown.

PPN 278 indicates the next page in the page table translation hierarchy. If PTE 240 is at the lowest level of the page table translation hierarchy, then PPN 278 corresponds to a data page. Size bit 280 is a bit that is set to zero when the corresponding PTE 240 is the lowest level of the page table translation hierarchy. Since the size of the pages may vary within the memory 104, size bit 280 may be set to zero in PTEs 240 at various levels in the page table translation hierarchy. In this fashion, one or more levels in the page table hierarchy are not traversed when addressing large pages and, consequently, memory accesses are streamlined. Accessed bit 275 indicates whether the page at PPN 278 was accessed since the accessed bit 275 was previously cleared. In operation, when data is written to or read from memory 104, accessed bits 275 of PTEs 240 corresponding to a page in memory 104 that is being written to or read from is set (assigned a value of one). Various modules, such as hypervisor 114 and LP shareability estimator 180, may clear accessed bits 275 as part of monitoring operations.

When a page in physical memory space 202 is mapped small, the hypervisor 114 creates a small page mapping 232 that links the corresponding PTE 240 in L1 page table 212 to small page 192 in memory 104. By contrast, when a page in physical memory space 202 is mapped large, the hypervisor 114 creates a large page mapping 230 that links the corresponding PTE 240 in L2 page table 210 to large page 194 in memory 104 and then updates PTE 240 to indicate that there is no mapped L1 page table 212. This update includes modifying the size bit 280 appropriately. Various modules within hypervisor 114, including VMMs 140 and page sharing module 186, update small page mappings 232 and large page mappings 230.

Figure 3:
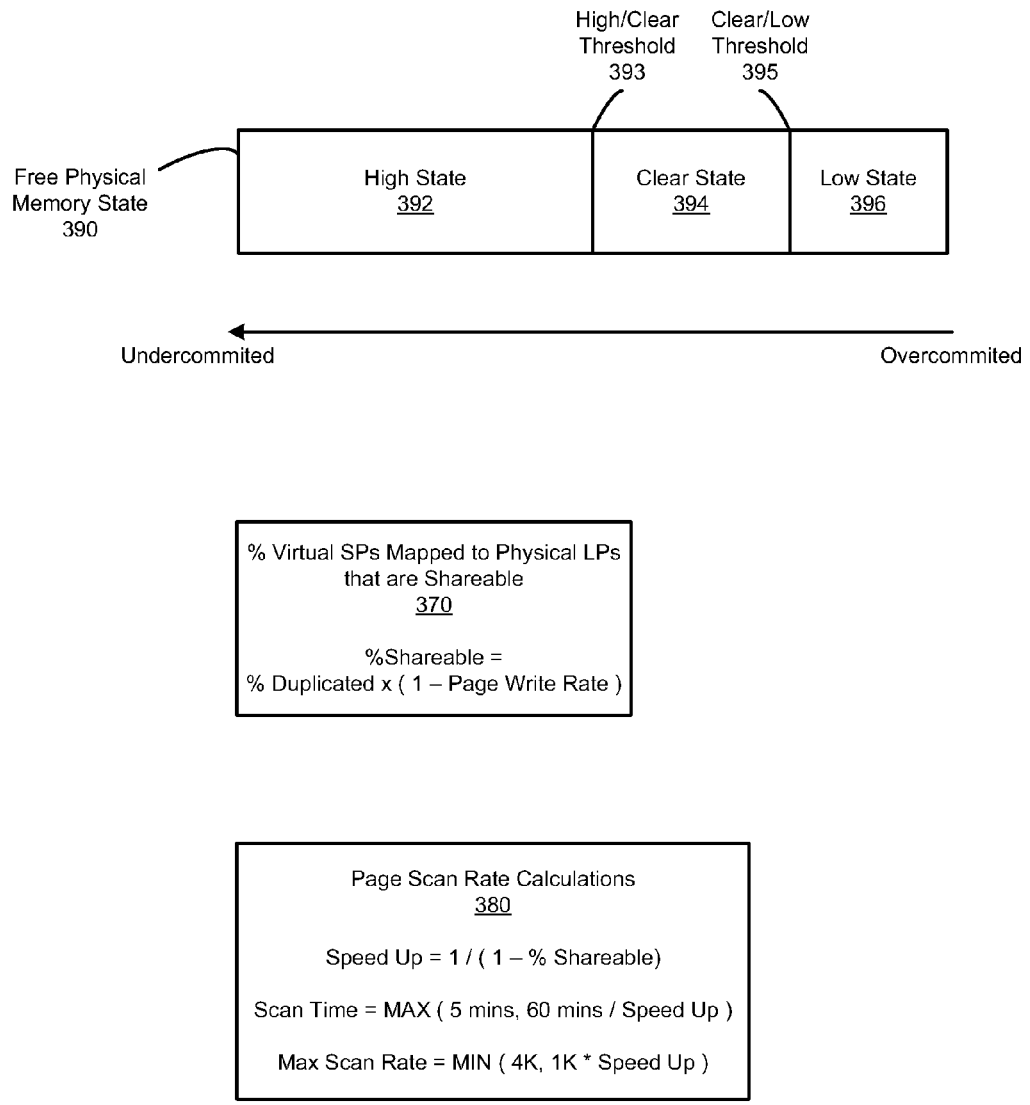
FIG. 3 is a conceptual diagram that illustrates free physical memory states and page scan rate calculations that influence VM small page (SP) scan modules, according to one or more embodiments.

FIG. 3 is a conceptual diagram that illustrates free physical memory states 390 and page scan rate calculations 380 that influence VM small page (SP) scan modules 170, according to one or more embodiments. As shown, free physical memory state 390 is one of a high state 392, a clear state 394, and a low state 396. As also shown, a high/clear threshold 393 represents the boundary between high state 392 and clear state 394. Similarly, a clear/low threshold 395 represents the boundary between clear state 394 and low state 396. In general, high/clear threshold 393 and clear/low threshold 395 may be determined in any manner consistent with optimizing the performance of host computer system 100. For example, in some embodiments, clear/low threshold 395 may be set based on the size of physical host memory 104 and high/clear threshold 393 may be set to a multiple of clear/low threshold 395.

If free memory is relatively high, then free physical memory state 390 is high state 392 and hypervisor 114 does not break physical LPs 194. If free memory is relatively low, then free physical memory state 390 is low state 396, hypervisor 114 breaks physical LPs 194 and employs other, more expensive memory reclamation techniques (e.g., ballooning and host swapping). Clear state 394 represents an intermediate state between high state 392 and low state 396 in which hypervisor 114 proactively breaks physical LPs 194 prior to resorting to more expensive memory reclamation techniques. Advantageously, since hypervisor 114 proactively breaks physical LPs 194 so that the memory can be reclaimed through page sharing, hypervisor 114 reduces the amount of time that hypervisor 114 spends performing expensive memory reclamation techniques compared to conventional hypervisors that do not include clear state 394. Consequently, overall performance of applications 113 executing in VMs 120 is improved.

VM SP scan module 170 performs some small page scanning operations in all states of free physical memory 390. More specifically, VM SP scan module 170 scans virtual SPs 196 and identifies duplicated virtual SPs 196 at the page scan rate. To enable efficient identification of duplicated virtual SPs 196, VM SP scan module 170 calculates page signatures (e.g., a hash value generated based on the content of the candidate virtual SP 196) of virtual SPs 196 and maintains a page signature hash table. As VM SP scan module 170 scans each virtual SP 196, VM SP scan module 170 calculates the page signature of virtual SP 196 and compares the page signature to the page signatures included in the signature hash table.

In high state 392, if duplicated virtual SP 196 is not mapped to physical LP 194, then VM SP scan module 170 sends duplicated virtual SP 196 to VMM 140 for sharing and memory reclamation. By contrast, if duplicated virtual SP 196 is mapped to physical LP 194, then VM SP scan module 170 does not send duplicated virtual SP 196 to VMM 140 for sharing and memory reclamation. Since VMM 140 does not receive duplicated virtual SPs 196 that are mapped to physical LPs 194 for sharing, VMM 140 does not break physical LPs 194 in high state 392. When free physical memory state 390 is either clear state 394 or low state 396, VM SP scan module 170 sends duplicated virtual SP 196 to VMM 140 for sharing and potential memory reclamation irrespective of whether duplicated virtual SP 196 is mapped to physical LP 194. Upon receiving duplicated virtual SP 196, if VMM 140 determines that duplicated virtual SP 196 is mapped to physical LP 194, then VMM 140 breaks physical LP 194 prior to sharing duplicated virtual SP 196.

In alternate embodiments, when free physical memory state 390 is clear state 394 and duplicated virtual SP 196 is mapped to physical LP 194, VM SP scan module 170 does not necessarily send duplicated virtual SP 196 to VMM 140 for sharing and potential memory reclamation. VM SP scan module 170 determines whether to send duplicated virtual SP 196 to VMM 140 based on the activity level of physical LP 194 backing duplicated virtual SP 196. If VM SP scan module 170 determines that physical LP 194 backing duplicated virtual SP 196 is relatively active, then VM SP scan module 170 does not send duplicated virtual SP 196 to VMM 140, physical LP 194 is not broken, and virtual SP 196 is not shared. By contrast, if VM SP scan module 170 determines that LP 194 backing duplicated virtual SP 196 is relatively inactive, then VM SP scan module 170 sends duplicated virtual SP 196 to VMM 140, VMM 140 breaks physical LP 194, and page sharing module 186 shares duplicated virtual SP 196 (corresponding to physical SP 192). Advantageously, by selecting duplicated SP virtual 196 for sharing based on the activity level of physical LP 194 backing duplicated virtual SP 196, VM SP scan module 170 increases the likelihood that breaking physical LP 194 leads to a performance increase attributable to the reduced memory pressure that exceeds the performance decrease caused by TLB misses.

VM SP scan module 170 may determine the activity level of physical LP 194 and the threshold at which physical LP 194 is considered relatively active in any technically fashion. For instance, in some embodiments, VM SP scan module 170 periodically reads accessed bits 275 in page table entries 240 and then clears accessed bits 275. In this fashion, VM SP scan module 170 may determine whether physical LP 194 has been accessed within a fixed duration of time. If VM SP scan module 170 determines that physical LP 194 has been accessed during the fixed duration of time, then VM SP scan module 170 considers physical LP 194 to be relatively active.

To optimize performance of applications 113, scan rate adjuster 183 dynamically modifies the page scan rate to reflect the changing usage of memory 104. When free physical memory state 390 is high state 392, scan rate adjuster 183 sets page scan rate to a relatively low default page scan rate, thereby reducing the performance degradation caused by performing small page scanning operations. However, when free physical memory state 390 is either clear state 394 or low state 396, scan rate adjuster 183 tailors the page scan rate to reflect an estimated "percentage (%) of virtual SPs mapped to physical LPs that are shareable" 370.

Scan rate adjuster 183 modifies the page scan rate when free physical memory transitions across high/clear threshold 393. VM SP scan module 170 operates at this page scan rate until free physical memory transitions back across high/clear threshold 393. Upon detecting a transition from clear state 394 to high state 392, scan rate adjuster 183 sets the page scan rate to a relatively low default page scan rate. Upon detecting a transition from high state 392 to clear state 394, scan rate adjuster 183 adjusts the page scan rate based on the estimated "percentage of virtual SPs mapped to physical LPs that are shareable" 370. If the estimated "percentage of virtual SPs mapped to physical LPs that are shareable" 370 is relatively low, then scan rate adjuster 183 sets the page scan rate to a correspondingly low value to reduce the time spent performing ineffectual small page scanning operations. If the estimated "percentage of virtual SPs mapped to physical LPs that are shareable" 370 is relatively high, then scan rate adjuster 183 sets the page scan rate to a correspondingly high value, thereby increasing the rate at which page sharing module 186 break physical LPs 194 and shares duplicated virtual SPs 196.

In some embodiments, to reduce the likelihood that free physical memory state 390 "ping-pongs" between high state 392 and clear state 394, high/clear threshold 393 is replaced by two thresholds: a high to clear threshold and a clear to high threshold. The high to clear threshold is higher than the clear to high threshold, and the difference protects against the ping-pong effect. Similarly, clear/low threshold 395 is replaced by a clear to low threshold and a higher low to clear threshold. In some embodiments, instead of adding a clear to high threshold, transitions from clear to high are initiated when free physical memory state 390 increases above high/clear threshold 393 by a predetermined amount In the embodiment shown in FIG. 3, page scan rate is a composite of "scan time" and "max scan rate." The scan time (also referred to herein as sharing scan time) specifies the length of time in which VM SP scan module 170 scans the entire virtual address space 203 of corresponding VM 120. The max scan rate (also referred to herein as maximum scan rate) limits the maximum number of virtual SPs 196 that VM SP scan module 170 scans per minute. As shown in page scan rate calculations 380, scan rate adjuster 183 first calculates a "speed up" that correlates to the estimated "percentage of virtual SPs mapped to physical LPs that are shareable" 370. Subsequently, scan rate adjuster 183 sets scan time to be in inversely proportional to the speed up and max scan rate to be proportional to the speed up. To ensure that VM SP scan module 170 does not consume an unacceptable amount of host computer system 100 resources, such as CPU 103, scan rate adjuster 183 bounds the scan time to a minimum of five minutes, and max scan rate to a maximum of 4K virtual SPs 196.

In alternate embodiments, the page scan rate may or may not be a composite of scan time and max scan rate, scan time may be bounded by values other than five minutes, and max scan rate may be bounded by values other than 4K virtual SPs 196. Further the page scan rate may be determined in any technically feasible fashion that reflects shareability of virtual SPs 196 mapped to physical LPs 194. In general, the default page scan rate, default scan time, and default max scan rate may be assigned in any manner consistent with limiting the resources dedicated to performing small page scanning operations when free physical memory state 390 is high state 392 and the impact of page sharing is diminished.

To estimate "percentage of virtual SPs mapped to physical LPs that are shareable" 370, LP shareability estimator 180 executes when free physical memory state 390 is high state 392 and physical LPs 194 are not being broken. When physical LPs 194 are not being broken, the large page mappings 230 are stable and "percentage of virtual SPs mapped to physical LPs that are shareable" 370 is meaningful. As shown, the estimated "percentage of virtual SPs mapped to physical LPs that are shareable" 370 reflects both a percentage of virtual SPs 196 mapped to physical LPs 194 that are duplicated ("% duplicated") and an estimated percentage of virtual SPs 196 written per minute ("page write rate"). The page write rate correlates to the likelihood that duplicated virtual SP 196 will be written and thus may no longer be shareable prior to VMM 140 receiving duplicated virtual SP 196 from VM SP scan module 170.

LP shareability estimator 180 may estimate the page write rate and the percentage of virtual SPs 196 mapped to physical LPs 194 that are duplicated in any technically feasible fashion. For instance, LP shareability estimator 180 may obtain an estimated percentage of pages written per minute from a working set estimator included in VMM 140. One method that LP shareability estimator 180 may employ to estimate the percentage of virtual SPs 196 mapped to physical LPs 194 that are duplicated is detailed in FIG. 4.

Figure 4:
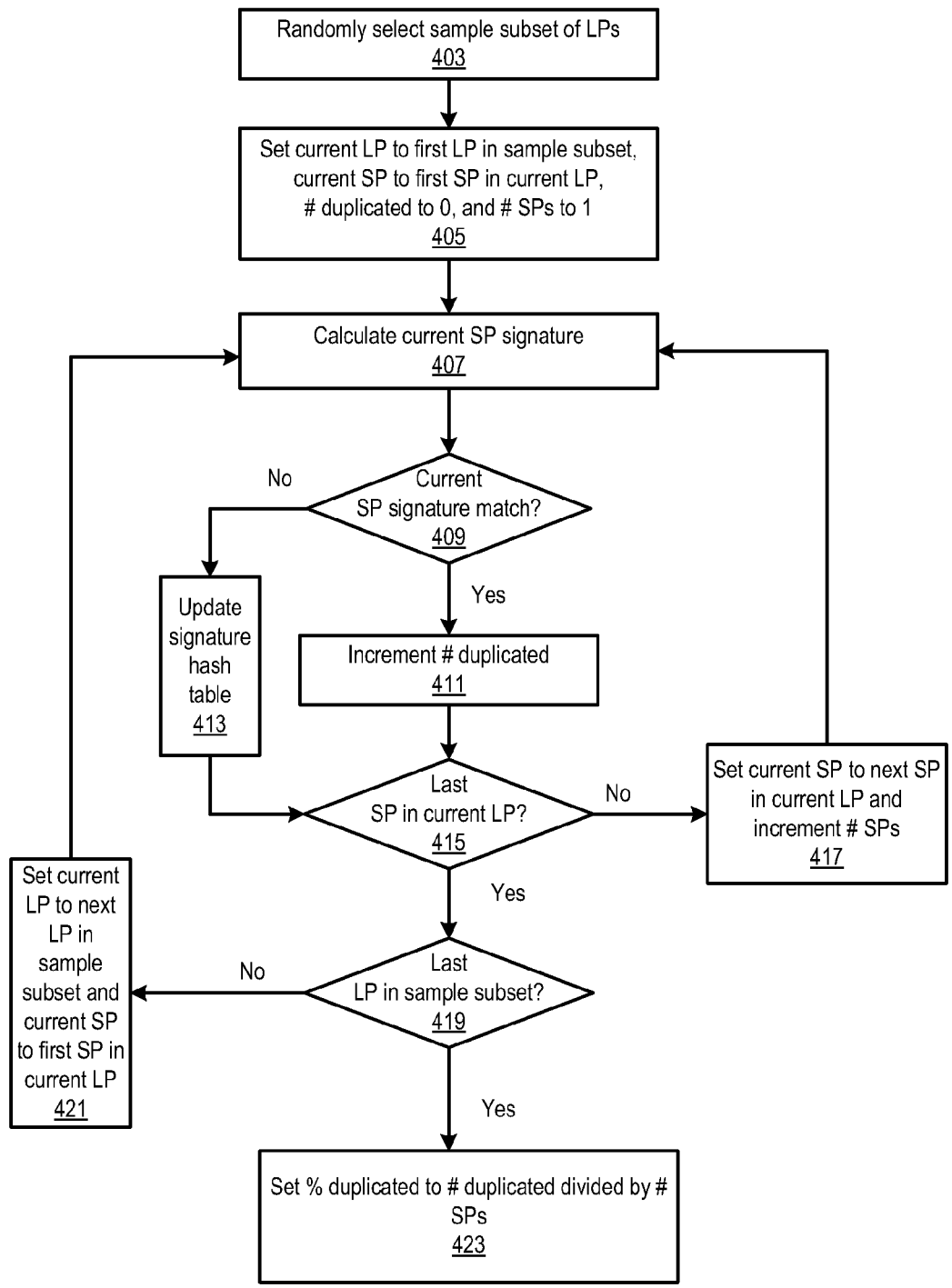
FIG. 4 depicts a flow diagram that illustrates a method for statistically estimating a percentage of virtual small pages mapped to physical large pages that are duplicated, according to one or more embodiments.

FIG. 4 depicts a flow diagram that illustrates a method for statistically estimating a percentage of virtual SPs 196 mapped to physical LPs 194 that are duplicated, according to one or more embodiments. In the embodiment illustrated herein, free physical memory state 390 is high state 392. Since hypervisor 114 does not break physical LPs 194 while free physical memory state 390 is high state 392, large page mappings 230 are stable and large page (LP) shareability estimator 180 can meaningfully estimate the percentage of virtual SPs 196 mapped to physical LPs 194. Notably, LP shareability estimator 180 is disabled in both clear state 394 and low state 396 when physical LPs 194 are actively broken and would render such an estimate meaningless. In operation, while LP shareability estimator 180 is enabled, LP shareability estimator 180 continuously repeats this method.

This method begins at step 403 where LP shareability estimator 180 randomly selects a sample subset of physical LPs 194 in memory 104. At step 405, LP shareability estimator 180 initializes an outer loop that processes each physical LP 194 in the sample subset and an inner loop that processes each virtual SP 196 that is backed by physical LP 194. To initialize these loops, for each physical LP 194 in the sample subset, LP shareability estimator 180 sets current physical LP 194 to the first physical LP 194 in the sample subset, current virtual SP 196 to the first virtual SP 196 that is mapped to physical LP 194, a number of virtual SPs 196 to 1, and a number of duplicated virtual SPs 196 to 0.

At step 407, LP shareability estimator 180 calculates the page signature of current virtual SP 196. LP shareability estimator 180 then compares (step 409) the page signature of current virtual SP 196 to the page signatures included in a signature hash table. Each entry in the signature hash table records a hash value of a shared virtual page and the physical page number of a shared page. Together, the VM SP scan modules 170 and LP shareability estimator 180 maintain the signature hash table to preserve information in a form that facilitates efficient comparison operations. More specifically, VM SP scan module 170 and LP shareability estimator 180 add new page signatures to the page signature hash table as part of scanning virtual SPs 196.

At step 409, if LP shareability estimator 180 determines that the page signature of current virtual SP 196 matches a page signature included in the signature hash table, then LP shareability estimator 180 considers current virtual SP 196 to be a duplicated virtual SP 196. This method then proceeds to step 411, where LP shareability estimator 180 increments the number of duplicated virtual SPs 196 and this method continues at step 415. Returning to step 409, if LP shareability estimator 180 determines that current virtual SP 196 is not a duplicated virtual SP 196, then this method proceeds directly to step 413. At step 413, LP shareability estimator 180 updates the signature hash table to reflect the page signature of current virtual SP 196 and this method proceeds to step 415.

If, at step 415, LP shareability estimator 180 determines that current virtual SP 196 is not the last virtual SP 196 backed by current physical LP 194, then this method proceeds to step 417. At step 417, LP shareability estimator 180 sets current virtual SP 196 to the next virtual SP 196 backed by current physical LP 194, increments the number of virtual SPs 196, and the method returns to step 407, where LP shareability estimator 180 processes the new current virtual SP 196. LP shareability estimator 180 continues to execute steps 407-417, processing virtual SPs 196 backed by current physical LP 194 until LP shareability estimator 180 has evaluated all virtual SPs 196 backed by current physical LP 194. Returning to step 415, if LP shareability estimator 180 determines that current virtual SP 196 is the last virtual SP 196 backed by current physical LP 194, then this method proceeds directly to step 419.

At step 419, if LP shareability estimator 180 determines that current physical LP 194 is not the last physical LP 194 in the sample subset, then this method proceeds to step 421. At step 421, LP shareability estimator 180 sets current physical LP 194 to the next physical LP 194 in the sample subset and current virtual SP 196 to the first virtual SP 196 that is backed by current LP 194. This method then returns to step 407 where LP shareability estimator 180 processes new current virtual SP 196. LP shareability estimator 180 continues to execute steps 407-421, processing all virtual SPs 196 backed by physical LPs 194 included in the sample subset, until LP shareability estimator 180 has finished evaluating all virtual SPs 196 backed by physical LPs 194 in the sample subset (step 419).

After evaluating all virtual SPs 192 backed by LPs 194 included in the sample subset, LP shareability estimator 180 sets the percentage of virtual SPs 196 mapped to physical LPs 194 that are duplicated to the number of duplicated SPs (backed by physical LPs 194 included in the sample subset) divided by the number of SPs (backed by physical LPs 194 included in the sample subset), and this method ends. While LP shareability estimator 180 is enabled, LP shareability estimator 180 repeatedly executes this method, randomly choosing new sample subsets at step 403 and re-estimating the percentage of virtual SPs 196 mapped to physical LPs 194 that are duplicated based on the new sample subsets.

Figure 5:
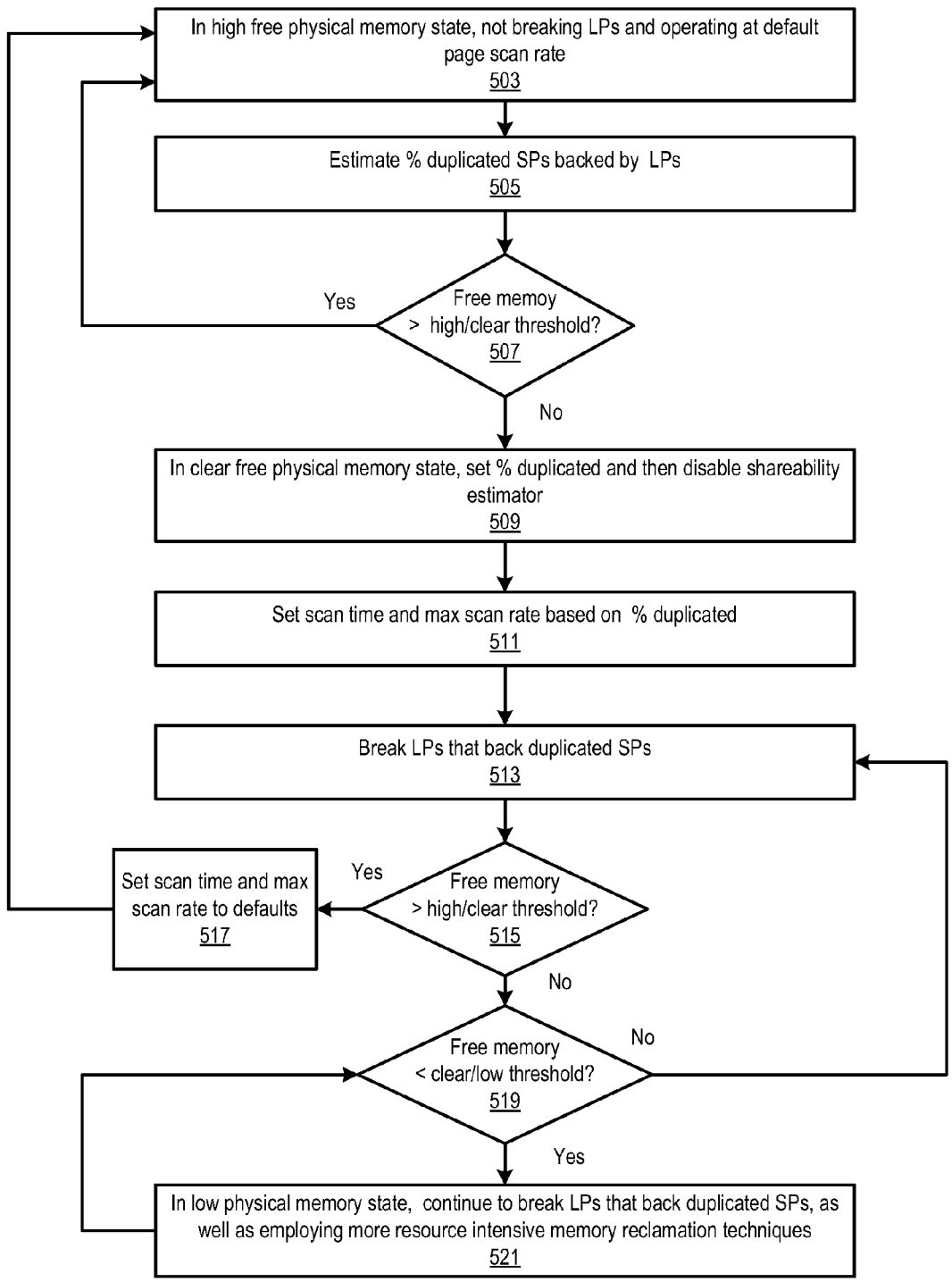
FIG. 5 depicts a flow diagram that illustrates a method for adjusting a page scan rate based on the amount of free memory and estimated percentage of virtual small pages mapped to physical large pages that are duplicated, according to one or more embodiments.

FIG. 5 depicts a flow diagram that illustrates a method for adjusting a page scan rate based on an amount of free memory and an estimated percentage of virtual small pages backed by large pages that are duplicated, according to one or more embodiments. In the embodiment illustrated herein, free physical memory state 390 is initially high state 392. Each VM SP scan module 170 independently and continually executes the steps in this method throughout the lifetime of the corresponding VM 120. For purposes of illustration only, the steps in this method are described in the context of a single VM 120, a single VMM 140, and a single VM SP scan module 170.

This method begins at step 503, where free physical memory state 390 is high state 392, and VM SP scan module 170 is identifying virtual SPs 196 (in virtual address space 203 of VM 120) that are not backed by physical LPs 194 but are instead backed by physical SPs 192 in host physical memory 104. VM SP scan module 170 then sends the identified duplicated virtual SPs 196 to VMM 140 for sharing and associated memory reclamation. Since VM SP scan module 170 does not send virtual SPs 196 mapped to physical LPs 194 to VMM 140, physical LPs 194 are not broken in high state 392. Upon initialization or detecting a transition to high state 392, scan rate adjuster 182 sets the page scan rate of VM SP scan module 170 to a default page scan rate that limits the resources consumed performing small page scanning operations when free memory 104 is relatively high, thereby optimizing the performance of applications 113 executing in VM 120. As detailed in the method steps of FIG. 4, while free physical memory state 390 is high state 392, LP shareability estimator 180 is enabled and statistically estimating the percentage of virtual SPs 196 mapped to physical LPs 194 that are duplicated (step 505).

At step 507, if VM SP scan module 170 determines that the amount of free memory 104 is still greater than high/clear threshold 393, then this method returns to step 503. VM SP scan module 170 and LP shareability estimator 180 continue to execute steps 503-507, operating consistently with high state 392 until free physical memory state 390 transitions to clear state 394. Returning to step 507, if VM SP scan module 170 determines that the amount of free memory 104 is not higher than high/clear threshold 393, then this method proceeds to step 509.

At step 509, since free physical memory state 390 has transitioned from high state 392 to clear state 394, VM SP scan module 170 and scan rate adjuster 182 perform transition operations to enable VM SP scan module 170 to optimally leverage opportunities to break physical LPs 194 and share duplicated virtual SPs 196 mapped to physical LPs 194. More specifically, LP shareability estimator 180 is disabled, scan rate adjuster 182 estimates "percentage virtual SPs backed by physical LPs that are shareable" 370, and then scan rate adjuster 182 sets page scan rate based on page scan rate calculations 380 (step 511).

Scan rate adjuster 183 estimates "percentage of virtual SPs mapped to physical LPs that are shareable" 370 based on the percentage of virtual SPs 196 mapped to physical LPs 194 that are duplicated obtained from LP shareability estimator 180 and an estimated percentage of pages written per minute obtained from a working set estimator that executes in VMM 140. Scan rate adjuster 183 then sets the page scan rate of VM SP scan module 170 based on page scan rate calculations 380, calculating a page scan rate that correlates to estimated "percentage of virtual SPs mapped to physical LPs that are shareable" 370. In this fashion, scan rate adjuster 183 tailors the page scan rate to represent a judicious tradeoff between the magnitude of performance gains expected from breaking physical LPs 194 and the performance degradation attributable to performing the small page scanning operations.

At step 513, VM SP scan module 170 operates at the optimized page scan rate, identifies duplicated virtual SPs 196, and sends the identified duplicated virtual SPs 196 to VMM 140 and page sharing module 186 for sharing and associated memory reclamation. Since VM SP scan module 170 sends virtual SPs 196 mapped to physical LPs 194 to VMM 140, physical LPs 194 are broken in clear state 394.

If, at step 515, VM SP scan module 170 determines that free memory 104 now exceeds high/clear threshold 393, then this method proceeds to step 517. Since free physical memory state 390 has transitioned from clear state 394 to high state 392, scan rate adjuster 183 restores the page scan rate of VM SP scan module 170 to the default page scan rate, and this method returns to step 503. LP shareability estimator 180 resumes executing and VM SP scan module 170 ceases sending virtual SPs 196 that are backed by physical LPs 194 to VMM 140 and page sharing module 186 for sharing and memory reclamation.

Returning to step 515, if VM SP scan module 170 determines that the amount of free memory 104 does not exceed high/clear threshold 393, then this method proceeds to step 519. If, at step 519, VM SP scan module 170 determines that the amount of free memory 104 is higher than clear/low threshold 395, then VM SP scan module 170 determines that free physical memory state 390 is still clear state 394, and this method returns to step 513. At step 513, VM SP scan module 170 continues to operate consistently with clear state 394, sending virtual SPs 196 to VMM 140 and page sharing module 186 for sharing and memory reclamation irrespective of the size of page backing virtual SPs 196. VM SP scan module 170 continues in this fashion, repeating through steps 513-519 until free physical memory state 390 transitions to high state 392 or low state 396.

Returning to step 519, if VM SP scan module 170 determines that the amount of free memory 104 no longer exceeds clear/low threshold 395, then VM SP scan module 170 determines that free physical memory state 190 has transitioned to low state 396. In low state 396, VM SP scan module 170 continues to operate at the optimized sharing rate, VM SP scan module 170 continues to send virtual SPs 196 to VMM 140 for sharing and memory reclamation irrespective of the size of page backing virtual SPs 196, and LP shareability estimator 180 is still disabled. However, at step 521, in addition to performing small page scanning operations and breaking physical LPs 194 to reclaim memory, hypervisor 114 also executes more resource intensive memory reclamation techniques, such as ballooning and host page swapping.

VM SP scan module 170 continues to execute in this fashion (cycling through steps 519-521) until VM SP scan module 170 determines (at step 519) that free physical memory state 190 has transitioned back to clear state 394, and this method returns to step 513. At step 513, VM SP scan module 170 continues to send virtual SPs 196 to VMM 140 for sharing and memory reclamation irrespective of the size of page backing virtual SPs 196, but hypervisor 114 stops executing more resource intensive memory reclamation techniques. VM SP scan module 170 and LP shareability estimator 180 continue to execute steps 503-521, exhibiting behavior tailored to the free physical memory state 190 and the statistical estimation of "percentage of virtual SPs mapped to physical LPs that are shareable" 370.

Figure 6:
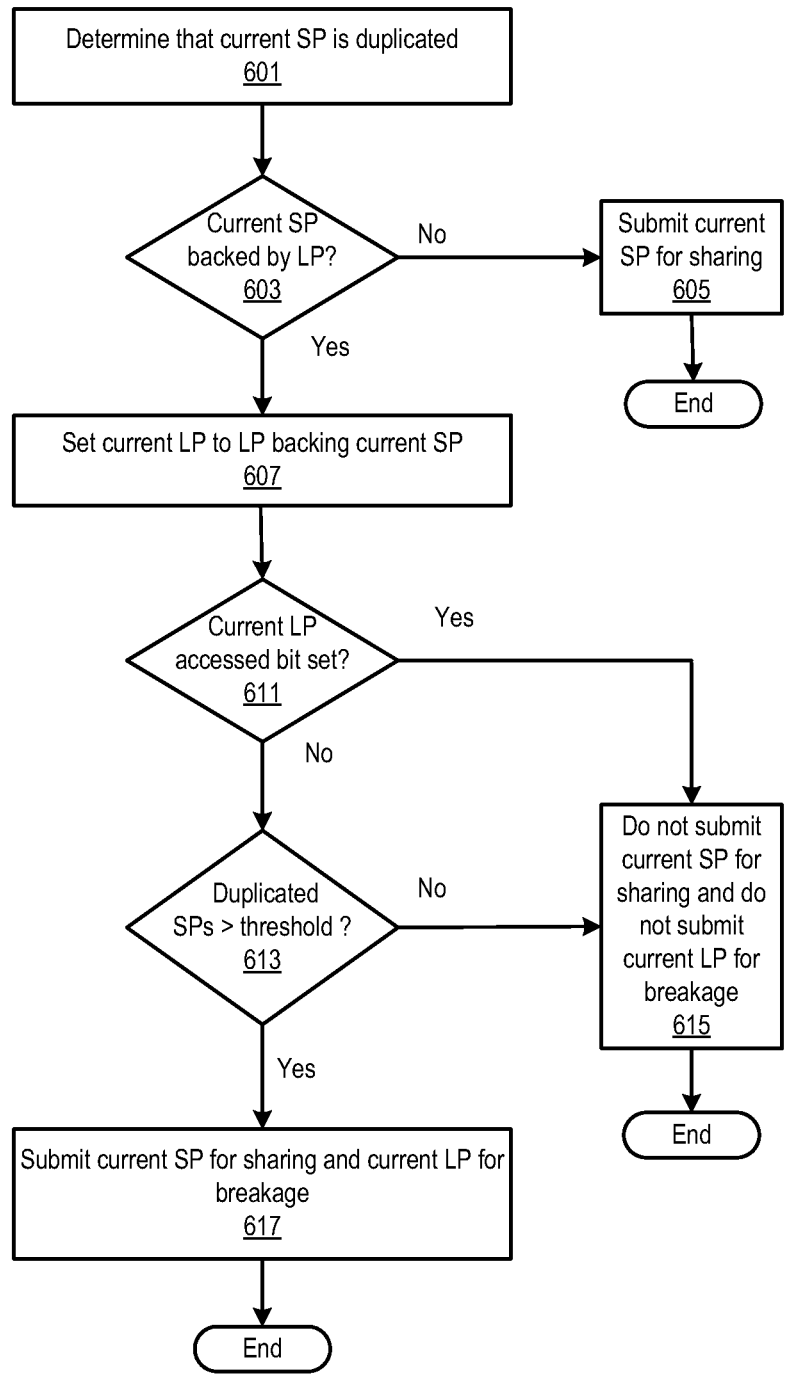
FIG. 6 depicts a flow diagram that illustrates a method for gating small page sharing and associated large page breakage operations based on activity levels, according to one or more embodiments.

FIG. 6 depicts a flow diagram that illustrates a method for gating small page sharing and associated large page breakage operations based on activity levels, according to one or more embodiments. For explanatory purposes, the context of this method is that VM SP scan module 170 periodically reads accessed bits 275 in page table entries 240 of physical LPs 194 and then clears accessed bits 275. Consequently, set accessed bits 275 represent physical LPs 194 that have been accessed during a fixed duration of time and cleared accessed bits 275 represent physical LPs 194 that have not been accessed during the fixed duration of time. Further, free physical memory state 390 is clear state 394 and VM SP scan module 170 is configured to exclude virtual SPs 196 mapped to relatively active physical LPs 194 that are duplicated from virtual SP 196 page sharing and associated physical LP 194 breakage operations.

This method begins at step 601 where VM SP scan module 170 determines that a current virtual SP 196 is duplicated. At step 603, if VM SP scan module 170 determines that current virtual SP 196 is not backed by any physical LP 194, then this method proceeds to step 605. At step 605, VM SP scan module 170 submits the current virtual SP 196 to VMM 140 for sharing by page sharing module 186. Since current virtual SP 196 is not backed by any physical LP 194, sharing virtual SP 196 does not involve breaking any physical LP 194, and this method ends.

If, at step 603, VM SP scan module 170 determines that current virtual SP 196 is backed by physical LP 194, then this method proceeds directly to step 607. At step 607, VM SP scan module 170 sets current physical LP 194 to the physical LP 194 backing current virtual SP 196. If, at step 611, VM SP scan module 170 determines that accessed bit 275 in current physical LP 194 is set, then VM SP scan module 170 considers current physical LP 194 to be relatively active and a poor candidate for breakage, and this method proceeds directly to step 615. At step 615, because VM SP scan module 170 considers current physical LP 194 to be a poor choice for breakage, VM SP scan module 170 does not submit current virtual SP 196 to VMM 140 for current virtual SP 196 sharing and current physical LP 194 breakage by page sharing module 186, and this method ends.

At step 611, if VM SP scan module 170 determines that accessed bit 275 in current physical LP 194 is not set, then VM SP scan module 170 considers current physical LP 194 to be relatively inactive and potentially a good candidate for breakage. At step 613, if VM SP scan module 170 determines that the number of virtual SPs 196 mapped to current physical LP 194 that are duplicated is not greater than a predetermined threshold, then VM SP scan module 170 determines that the number of virtual SPs 196 mapped to current physical LP 194 that are duplicated is too low to justify the overhead associated with breaking current physical LP 194, and this method proceeds to step 615. At step 615, because VM SP scan module 170 considers physical LP 194 to be relatively poor candidate for breakage, VM SP scan module 170 does not submit current virtual SP 196 to VMM 140 for current virtual SP 196 sharing and current physical LP 194 breakage by VMM 140, and this method ends At step 613, if VM SP scan module 170 determines that the number of virtual SPs 196 mapped to current physical LP 194 that are duplicated is greater than a predetermined threshold, then VM SP scan module 170 considers current physical LP 194 to be a relatively good candidate for breakage, and this method proceeds to step 617. At step 617, VM SP scan module 170 submits current virtual SP 196 to VMM 140 for current virtual SP 196 sharing and current physical LP 194 breakage by page sharing module 186, and this method ends.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operation system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespace and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of determining a page scan rate of a memory that is partitioned and accessed as large physical pages and small physical pages to identify potential page sharing opportunities, comprising:
scanning at least one context for duplicated small virtual pages at a configurable page scan rate, wherein each of the at least one context has a virtual memory divided into a plurality of small virtual pages that are mappable to the physical pages;
statistically estimating a percentage of small virtual pages mapped to large physical pages that are shareable while performing small virtual page scanning operations at a first page scan rate; and
determining that the amount of free physical memory has decreased below a high memory threshold and, in response thereto, determining a second page scan rate based on the percentage of small virtual pages mapped to large physical pages that are shareable and performing small virtual page scanning operations at the second page scan rate instead of the first page scan rate.

2. The method of claim 1, further comprising:
after performing small virtual page scanning operations at the second page scan rate, determining that the amount of free physical memory has increased above the high memory threshold by a predetermined amount and,
in response thereto, performing small virtual page scanning operations at the first page scan rate instead of the second page scan rate.

3. The method of claim 1, further comprising:
after performing small virtual page scanning operations at the second page scan rate, determining that the amount of free physical memory has decreased below a low memory threshold and, in response thereto, executing one of memory reclamation operations other than page sharing.

4. The method of claim 1, further comprising:
while performing small virtual page scanning operations at the second page scan rate, selecting a large physical page to be broken up into small physical pages; and
breaking up the selected large physical page into small physical pages.

5. The method of claim 4, wherein the large physical page is selected if an activity level for the large physical page is lower than an activity threshold.

6. The method of claim 4, wherein the large physical page is selected if the number of duplicated small virtual pages mapped to the large page is greater than a predetermined threshold.

7. The method of claim 1, wherein statistically estimating the percentage of small virtual pages mapped to large physical pages that are shareable comprises:
statistically estimating a percentage of small virtual pages mapped to large physical pages that are duplicated; and
estimating the percentage of small virtual pages mapped to large physical pages that are shareable based on the estimated value for the percentage of small virtual pages mapped to large physical pages that are duplicated and an estimated rate of page writes.

8. The method of claim 7, wherein statistically estimating the percentage of small virtual pages mapped to large physical pages that are duplicated comprises:
selecting a sample set of large physical pages;
for each large physical page included in the sample set, identifying small virtual pages mapped to the large physical page that are duplicated; and
calculating the percentage of small virtual pages mapped to large physical pages that are duplicated based on the number of identified small virtual pages mapped to large physical pages that are duplicated and the total number of small virtual pages mapped to large physical pages in the sample set.

9. The method of claim 8, wherein selecting the sample set is random.

10. The method of claim 1, wherein determining the second page scan rate comprises:
setting a speed rate increase to the reciprocal of the difference between one hundred percent and the percentage of virtual small pages mapped to large pages that are shareable; and
assigning the second page scan rate according to the speed rate increase.

11. The method of claim 10, wherein assigning the second page scan rate according to the speed rate increase comprises:
calculating a sharing scan time based on the speed rate increase and a minimum sharing scan time;

calculating a maximum scan rate based on the speed rate increase and a maximum sharing scan rate; and setting the second page scan rate based on the sharing scan time and the maximum scan rate.

12. The method of claim 1, wherein the first page scan rate is a default page scan rate.

13. The method of claim 12, wherein the default page scan rate is based on a default sharing scan time and a default maximum scan rate.

14. A non-transitory computer-readable storage medium comprising instructions, which when executed in a computer system having memory that is partitioned and accessed as large physical pages and small physical pages, causes the computer system to carry out the steps of:

scanning at least one context for duplicated small virtual pages at a configurable page scan rate, wherein each of the at least one context has a virtual memory divided into a plurality of small virtual pages that are mappable to the physical pages;

statistically estimating a percentage of small virtual pages mapped to large physical pages that are shareable while performing small virtual page scanning operations at a first page scan rate; and determining that the amount of free physical memory has decreased below a high memory threshold and, in response thereto, determining a second page scan rate based on the percentage of small virtual pages mapped to large physical pages that are shareable and performing small virtual page scanning operations at the second page scan rate instead of the first page scan rate.

15. The non-transitory computer-readable storage medium of claim 14, further comprising:

after performing small page scanning operations at the second page scan rate, determining that the amount of free physical memory has increased above the high memory threshold by a predetermined amount and, in response thereto, performing small virtual page scanning operations at the first page scan rate instead of the second page scan rate.

16. The non-transitory computer-readable storage medium of claim 14, wherein statistically estimating the percentage of small virtual pages mapped to large physical pages that are shareable comprises:

statistically estimating a percentage of small virtual pages mapped to large physical pages that are duplicated; and estimating the percentage of small virtual pages mapped to large physical pages that are shareable based on the estimated value for the percentage of small virtual pages mapped to large physical pages that are duplicated and an estimated rate of page writes.

17. The non-transitory computer-readable storage medium of claim 16, wherein statistically estimating the percentage of small virtual pages mapped to large physical pages that are duplicated comprises:

selecting a sample set of large physical pages;

for each large physical page included in the sample set, identifying small virtual pages mapped to the large physical page that are duplicated; and calculating the percentage of small virtual pages mapped to large physical pages that are duplicated based on the number of identified small virtual pages mapped to large physical pages that are duplicated and the total number of small virtual pages mapped to large physical pages in the sample set.

18. A computer system comprising:

a physical memory that is partitioned and accessed as large physical pages and small physical pages;

at least one context, each of which having a virtual memory divided into a plurality of small virtual pages that are mappable to the physical pages; and a memory sharing module configured to identify identical small virtual pages, wherein the memory sharing module is configured to:

scan each of the at least one context for duplicated small virtual pages at a configurable page scan rate;

statistically estimate a percentage of small virtual pages mapped to large physical pages that are shareable while performing small virtual page scanning operations at a first page scan rate; and determine that the amount of free physical memory has decreased below a high memory threshold and, in response thereto, determine a second page scan rate based on the percentage of small virtual pages mapped to large physical pages that are shareable and perform small virtual page scanning operations at the second page scan rate instead of the first page scan rate.

19. The computer system of claim 18, wherein each of the at least one context comprises an application container without a guest operating system running therein, and the computer system further comprises a hardware abstraction layer hypervisor supporting the execution of the at least one application container.

20. The computer system of claim 18, wherein each of the at least one context comprises a virtual machine having a guest operating system running therein, and the computer system further comprises a hypervisor supporting the execution of the at least one virtual machine.

21. The computer system of claim 20, wherein statistically estimating the percentage of small virtual pages mapped to large physical pages that are shareable comprises:

statistically estimating a percentage of small virtual pages mapped to large physical pages that are duplicated; and estimating the percentage of small virtual pages mapped to large physical pages that are shareable based on the estimated value for the percentage of small virtual pages mapped to large physical pages that are duplicated and an estimated rate of page writes.

22. The computer system of claim 21, wherein statistically estimating the percentage of small virtual pages mapped to large physical pages that are duplicated comprises:

selecting a sample set of large physical pages;

for each large physical page included in the sample set, identifying small virtual pages mapped to the large physical page that are duplicated; and calculating the percentage of small virtual pages mapped to large physical pages that are duplicated based on the number of identified small virtual pages mapped to large physical pages that are duplicated and the total number of small virtual pages mapped to large physical pages in the sample set.

* * * * *